United States Patent

Ooki et al.

Patent Number: 5,621,532
Date of Patent: Apr. 15, 1997

[54] LASER SCANNING MICROSCOPE UTILIZING DETECTION OF A FAR-FIELD DIFFRACTION PATTERN WITH 2-DIMENSIONAL DETECTION

[75] Inventors: Hiroshi Ooki; Tomoya Noda, both of Yokohama, Japan

[73] Assignee: Nikon Corporation, Tokyo, Japan

[21] Appl. No.: 381,414

[22] Filed: Jan. 31, 1995

[30] Foreign Application Priority Data

Dec. 8, 1994 [JP] Japan .................................. 6-304795

[51] Int. Cl.$^6$ .................................................. G01N 21/00
[52] U.S. Cl. ........................... 356/444; 382/128; 382/134; 348/79
[58] Field of Search ..................................... 356/432, 444, 356/338, 345, 371; 250/230, 234; 382/131, 128, 134; 348/79–80

[56] References Cited

U.S. PATENT DOCUMENTS

| Re. 34,214 | 4/1993 | Carlsson . | |
|---|---|---|---|
| 3,809,478 | 5/1974 | Talbot | 356/71 |
| 4,037,965 | 7/1977 | Weiss | 356/338 |
| 4,549,204 | 10/1985 | Bertero et al. | 348/79 |
| 4,631,581 | 12/1986 | Carlsson . | |
| 4,734,578 | 3/1988 | Horikawa | 250/234 |
| 4,745,270 | 5/1988 | Horikawa et al. | 250/234 |
| 4,800,269 | 1/1989 | Horikawa | 250/234 |
| 4,845,552 | 7/1989 | Jaggi et al. | 382/128 |
| 4,873,440 | 10/1989 | Mori et al. . | |
| 4,893,008 | 1/1990 | Horikawa | 250/234 |
| 4,953,979 | 9/1990 | Hirako | 356/338 |
| 5,042,950 | 8/1991 | Salmon, Jr. | 356/353 |
| 5,086,222 | 2/1992 | Shibuya | 250/234 |
| 5,309,221 | 5/1994 | Fischer et al. | 356/73.1 |
| 5,428,447 | 6/1995 | Toida | 356/432 |

FOREIGN PATENT DOCUMENTS

| 3-21913 | 1/1991 | Japan . |
| 2173666 | 10/1986 | United Kingdom . |

OTHER PUBLICATIONS

Kawata, S. et al, "Laser Computed–Tomography Microscope", *Applied Optics*, vol. 29, No. 26, Sep. 10, 1990, pp. 3805–3809.

Primary Examiner—Frank Gonzalez
Assistant Examiner—Jason D. Vierra Eisenberg
Attorney, Agent, or Firm—Shapiro and Shapiro

[57] ABSTRACT

A laser scanning microscope provided with a laser light source, an illuminating optical system for condensing the light from the laser light source to form a light spot on a specimen, a scanning device for causing relative movement of the light spot with respect to the specimen, a photodetector for measuring the amount of light transmitted or reflected by the specimen, and an optical system with positive refraction power for guiding the light beam, transmitted or reflected by the specimen, to the light-receiving plane of the photodetector, wherein the photodetector is composed of a two-dimensional image sensor provided in a position displaced from the conjugate point of the light spot by such an amount that the light beam forms a far-field diffraction pattern of the specimen on the light-receiving plane of the photodetector.

14 Claims, 5 Drawing Sheets

LASER SCANNING MICROSCOPE UTILIZING DETECTION OF A FAR-FIELD DIFFRACTION PATTERN WITH 2-DIMENSIONAL DETECTION

BACKGROUND OF THE INVENTION

1. Field of the Invention

The present invention relates to an image forming technology applicable to both biological and industrial fields, and more particularly, among such image forming technology, to a laser scanning microscope.

2. Related Background Art

The conventional ordinary laser scanning microscope is generally designed to detect the total amount of light transmitted or reflected by a specimen.

There is also known a configuration having a one-dimensional image sensor on a position conjugate with the plane of the specimen, but such configuration is equivalent to the detection of total amount of light as the light spot moves on the sensor in the scanning operation.

As a development from such ordinary laser scanning microscope, there is known a laser scanning microscope as disclosed in U.S. Pat. Nos. 4,800,269 and 4,734,578, in which the photosensor device is divided into two or more segments and such divided photosensor device is placed at the exit pupil of an optical system with positive refractive power, and the electrical signals respectively obtained from the divided portions of the photosensor device are suitably processed. Such configuration combined with signal processing allows to obtain both a differential image of the specimen and an ordinary bright-field image, and a dark-field image can also be obtained by the use of a light-shielding mask.

Also S. Kawata et al. reported, in Laser computed-tomography microscope, Applied Optics, 29 (1990) 3805, the technology for obtaining a tomographic image utilizing computation (hereinafter called CT image) of the optical characteristics of the specimen.

Also Japanese Patent Application Laid-Open No. 3-21913 discloses the use of a two-dimensional image sensor as the photosensor device for the laser scanning microscope.

U.S. Pat. Nos. 4,800,269 and 4,734,578 explain that the laser scanning microscope disclosed therein can provide both the differential image of the specimen and the ordinary bright-field image, and also the dark-field image in combination with the use of the light-shielding mask, but do not suggest any other image information.

Also according to the technology reported by S. Kawata et al., Laser computed-tomography microscope, Applied Optics, 29 (1990) 3805, in order to obtain the CT image of the optical characteristics of the specimen, there are required images formed by illuminating the specimen from various observing angles, and it is totally impossible to realize such function with the detecting method in the conventional laser scanning system.

Also in the technology disclosed in Japanese Patent Application Laid-Open No. 3-21913, the image sensor is provided on the conjugate plane of the light spot and can therefore only provide the ordinary bright-field image, from the standpoint of collection of image information.

SUMMARY OF THE INVENTION

In consideration of an foregoing, the object of the present invention is to provide a laser scanning microscope capable, with a relatively simple structure, of providing images of the specimen observed from various observing angles.

The above-mentioned object can be attained, according to the present invention, by a laser scanning microscope comprising a laser light source, an illuminating optical system for condensing the light from said laser light source for forming a light spot on a specimen, scanning means for causing relative movement of said light spot with respect to said specimen, a photodetector for measuring the amount of light transmitted or reflected by said specimen, and an optical system with positive refraction power for guiding the light beam, transmitted or reflected by said specimen, to the light-receiving face of said photodetector, wherein said photodetector is composed of a two-dimensional image sensor provided at a position displaced from the conjugate point of said light spot by such an amount that said light beam forms a far-field diffraction pattern of said specimen on said light-receiving face of said photodetector.

It is preferable that said laser scanning microscope further comprises a memory for storing, in digitized form, the output signal of said two-dimensional image sensor, and a display unit for displaying the image of said specimen, based on the output signal from said two-dimensional image sensor or the output signal stored in said memory, wherein, at the scanning operation of said light spot on said specimen, said output signal from plural pixels of said two-dimensional image sensor is digitized and stored in said memory.

Also said scanning means is preferably means for moving a supporting stage, adapted to support said specimen.

Alternatively, the said scanning means maybe composed of light deflecting means provided at the pupil position of said illuminating optical system, and said two-dimensional sensor is provided, in said optical system with positive refractive power, at a position conjugate with the light deflecting plane of said light deflecting means.

Also said laser scanning microscope is preferably adapted to sum the output signals from mutually close plural pixels and to store the thus obtained sum signal in said memory as a representative value of the output signals of said plural pixels.

Also said laser scanning microscope is preferably adapted to display the image of said specimen on said display unit, utilizing only said output signals from a part of the pixels among said output signals obtained from said plural pixels of said two-dimensional image sensor and stored in said memory.

Furthermore it is desirable that said laser scanning microscope comprises a two-dimensional image processing device capable of digital operation and is adapted to calculate a new specimen image and display it by said display unit, based on plural images of said specimen reproduced from the output signals of only a part of the pixels, among said output signals obtained from said plural pixels of said two-dimensional image sensor and stored in said memory.

It is furthermore desirable, in said laser scanning microscope, that said image calculated from the plural images is a CT (computed-tomography) image of said specimen, and that such CT image is displayed by said display device.

In the laser scanning microscope of non-confocal type, the role of the illuminating optical system and that of the imaging optical system are inverted in comparison with the conventional imaging microscope. Consequently, an image that cannot be obtained in the imaging microscope without a modification in the illuminating condition can be obtained, in the laser scanning microscope, by selective detection of the light in the light-receiving device. Stated differently, images of different illuminating condition can be obtained by detecting the light at specified light-receiving positions of the laser scanning microscope.

The theory explained above will be described in more detail with reference to FIG. 4, which is a schematic view showing the principle of the present invention. A light beam condensed by an illuminating optical system 41 illuminates a specimen 42. The light beam transmitted by the specimen 42 is formed, by a lens 43 with positive refractive power, as a light beam of a certain size capable of forming a far-field diffraction pattern of the specimen 42, and reaches a photodetector 44. In this case the light beam transmitted by the specimen 42 at a certain angle $\theta_1$ finally enters a part 44a of the photodetector 44 as shown in FIG. 4, while the light beam transmitted by the specimen 42 at a different angle $\theta_2$ enters, as shown in FIG. 4, a part 44b, different from the part 44a, of the photodetector 44.

It will be understood, from the foregoing, that the light beams transmitted by the specimen with different angles fall on different parts of the photodetector. This fact signifies that the rays observing a same specimen from different angles reach and are detected by one-to-one corresponding predetermined positions of the photodetector. It will also be understood that the angle range in which the observation is possible is determined by the numerical aperture of the illuminating optical system, as will be apparent from FIG. 4.

The light beam entering the photodetector 44 has to have a certain size capable of forming the far-field diffraction pattern of the specimen 42. If the image of the specimen 42 is focused on the photodetector 44, the positions 44a and 44b, respectively corresponding to the angles $\theta_1$ and $\theta_2$, converge to a same position (focal position), so that the one-to-one relationship between the observing angles and the predetermined positions on the photodetector is lost.

The foregoing description clarified the presence of one-to-one correspondence between the observing angle of the specimen and the detecting position, but a more precise theory involves diffraction, as explained in detail by the present inventor, Hiroshi Ooki, in Optical Resolution Limit—Introduction to Ultra Resolution, Super-resolution Seminar Preprints, p. 25–p. 26, Japanese Society of Spectroscopy Feb. 2–3, 1994.

For more effective achievement of such selective detection depending on the observing angle, a two-dimensional image sensor is preferably used as the photodetector. Image formation by the output signals only from specified pixels of the two-dimensional image sensor can provide an image same as that obtainable in the imaging microscope by observing the specimen by a light source localized in a specified position.

However the light has to be guided onto said two-dimensional image sensor in such a state that the center of the far-field diffraction pattern, obtained by illuminating the specimen with the laser light spot, does not move by the scanning movement of said laser light spot, since otherwise the one-to-one relationship between the observing angle and the photodetector, as shown in FIG. 4, will be destroyed.

In the present invention, in order to finally display the image of the specimen effectively on the display device, it is preferable to use a memory and a display device, and to store the output signals in the memory in digitized form.

In case of stage scanning, in which the scanning operation is achieved by the movement of a stage supporting the specimen, the two-dimensional image sensor is preferably separated sufficiently from the conjugate point with the specimen. On the other hand, in case of beam scanning, in which the scanning operation is achieved by moving the laser beam spot on the specimen by means of light beam deflecting means such as a Galvano mirror, it is preferable, as shown in FIG. 5, to provide the light beam deflecting means at the pupil position of the illuminating optical system and to provide the two-dimensional image sensor at a position, in the optical system with positive refractive power, conjugate with the light deflecting plane of the light beam deflecting means, in order that the diffraction pattern does not move on the two-dimensional image sensor by the scanning motion of the light spot.

The above-mentioned concept will be explained in more detail with reference to FIG. 5, which is a schematic view showing the arrangement of the optical system in case of beam scanning. A parallel light beam 51, entering parallel to the optical axis 59 of an illuminating optical system 53, is condensed thereby on the focal point 54 thereof. In the actual use, the specimen is placed on the focal point 54. The light beam transmitted by the specimen is converted again into a parallel light beam by an optical system 55, having positive refractive power and which is coaxial with the optical axis 59 of the illuminating optical system 53, and then illuminates a two-dimensional image sensor 56. In this state the focal position of the optical system 55 coincides with that 54 of the illuminating optical system 53.

Next considered is a case in which the principal ray of a parallel light beam 52 entering with an angle $\theta$ crosses the other focal point 57 of the illuminating optical system 53 (pupil position thereof). When the principal ray of the parallel light beam 52 enters the illuminating optical system 53 in such state, said principal ray emerging from the illuminating optical system 53 becomes parallel to the optical axis 59 and enters the optical system 55 in this state. Said principal ray of the parallel light beam 52, having entered the optical system 55, is refracted thereby and reaches the other focal point 58 thereof. In case of beam scanning, the two-dimensional image sensor 56 is provided at said the other focal point 58 of the optical system with positive refractive power. The peripheral light beam, other than the principal ray, of the parallel light beam 52 is condensed on a plane perpendicular to the optical axis 59 and containing the focal point 54. The light beam is then converted again to a parallel light beam and illuminates the two-dimensional image sensor 56. On the two-dimensional image sensor 56, the principal rays of the parallel light beams 51, 52 fall on a same position, and the peripheral light beams of said parallel light beams 51, 52 also fall in mutually coinciding state.

Thus, as explained above, by varying the incident angle of the parallel light beam at the pupil position of the illuminating optical system 53 and placing the two-dimensional image sensor 56 at a position, in the optical system with positive refractive power, conjugate with the pupil position of the illuminating optical system, the light spot moves on a plane perpendicular to the optical axis 59 and containing the focal position 54, and, on the two-dimensional image sensor 56, a given point always corresponds to a predetermined observing angle.

Thus the selective use of the outputs from the pixels of the two-dimensional image sensor allows to obtain images of a same effect as if the observing angle (equivalent to illuminating condition) is varied in the conventional imaging microscope. However, the advantage of utilizing the two-dimensional image sensor lies in a fact that image output signals can be obtained from an arbitrary pixel present in the light-receiving plane.

For fully exploiting such advantage, it is preferable to separately store the output signals from all the pixels of the two-dimensional image sensor, and, after the scanning operation, to reproduce the image with the output signals of specified pixels only in the two-dimensional image sensor. The image thus reproduced is same as that obtained in the imaging microscope, by the observation of the specimen with a localized light source corresponding, in position and size, to said specified pixels. Naturally there can be reproduced images corresponding to the arbitrarily different observing angles (equivalent to illuminating conditions), by varying the pixels designated at the image reproduction. Moreover, all the plural images obtainable in this manner are recorded at a same time, and this is an extremely important factor, for example, in the observation of a living specimen. On the other hand, in the imaging microscope, for obtaining plural images with different illuminating conditions, the timings of such images have to be inevitably different.

Although, it is very meaningful to separately store all the pixel output signals of the two-dimensional image sensor provided in the aforementioned position as the photosensor device of the laser scanning microscope, there will be required an enormous memory size. It is therefore more preferable to calculate the sum (or average) of the outputs of closely positioned plural pixels, and to take such sum or average as the representative value of the outputs of said plural pixels. Such method not only reduces the required memory size but also achieves an effect of reducing the laser speckle noise appearing on the diffraction pattern projected on the two-dimensional image sensor. Consequently the number of pixels to be represented by a single output value is preferably determined in consideration of both the memory size and the remaining speckle noise.

It is also preferable not to store the outputs of unnecessary pixels of the two-dimensional image sensor.

As explained in the foregoing, the configuration of the present invention allows to obtain plural images of the specimen from different observing angles (equivalent to illuminating conditions) at a same time, and this feature can be most effectively exploited, as an application, by a combination with an optical CT microscope.

The principle of the optical CT microscope, disclosed in detail by S. Kawata et al., Laser computed-tomography microscope, Applied Optics, 29 (1990) 3805, will be briefly explained in the following. For obtaining CT images of a specimen through computer image processing, there are required plural original images obtained by observation (equivalent to illumination) in oblique manner from different directions. In the present invention, since the observing angle and the light-receiving position of the photodetector have one-to-one relationship as shown in FIG. 4, there can be easily obtained images of the same effect as if the observing angle (equivalent to illuminating condition) is varied, by selective utilization of the output signals from the pixels. Moreover these images can be arbitrarily extracted. In this manner the configuration of the present invention is extremely suitable for the requirement of the optical CT microscope.

DESCRIPTION OF THE PREFERRED EMBODIMENTS

In the following the present invention will be exemplified in detail by embodiments thereof.

Figure 1:
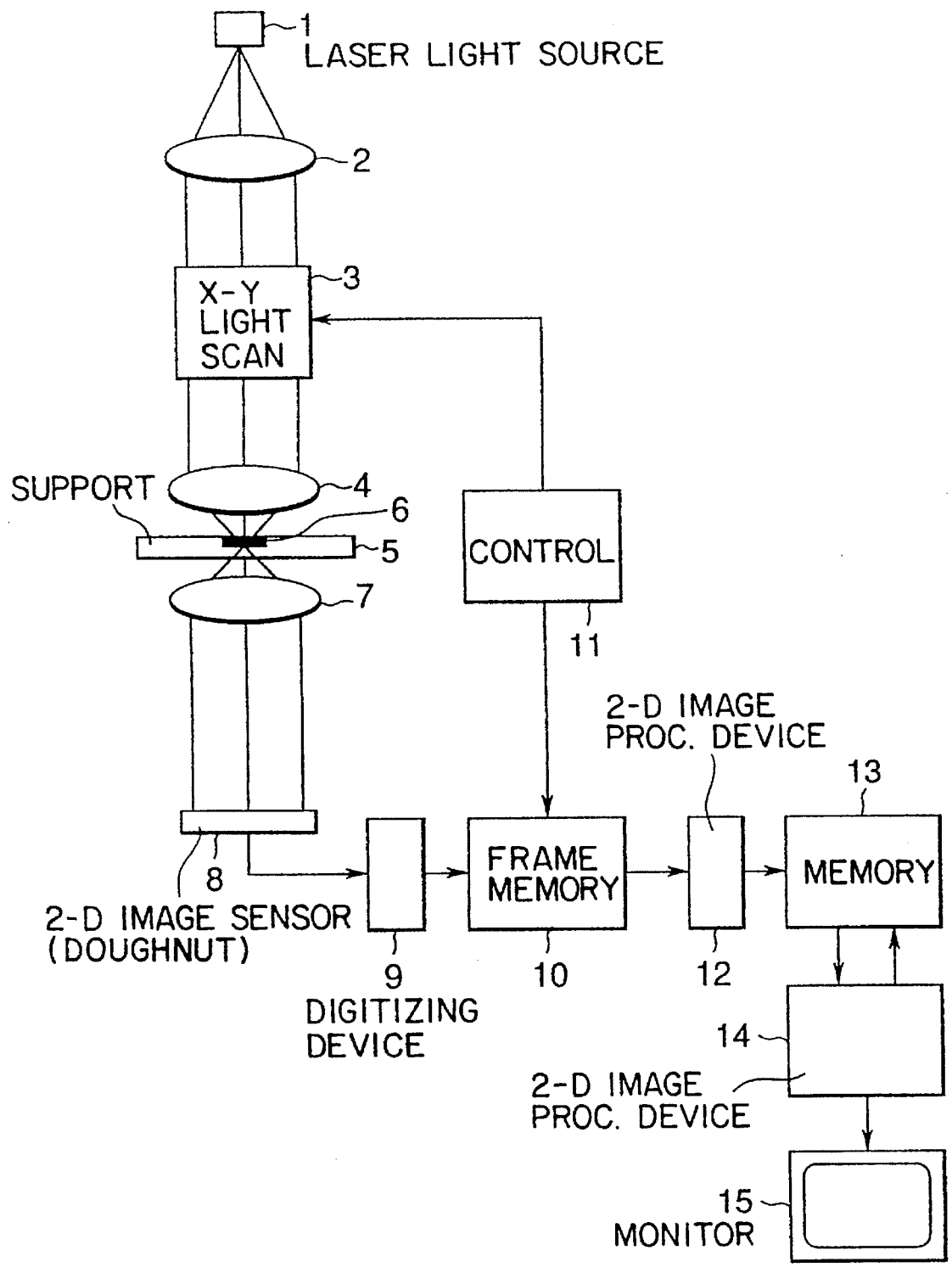
FIG. 1 is a schematic view showing the configuration of a first embodiment of the laser scanning microscope.

FIG. 1 is a schematic view showing the configuration of a first embodiment.

Light emitted by a laser light source 1 is converted into a parallel light beam by a lens 2 constituting an illuminating optical system, and is deflected by X-Y two-dimensional light scanning means 3. Said laser light source 1 can be composed, for example, of a He-Ne laser, a semiconductor laser or an argon (Ar) laser.

The X-Y two-dimensional light scanning means can be composed of a movable mirror such as a Galvano mirror or a polygon mirror, or other optical deflecting means such as an acoustooptical element. In either case, the light deflecting plane of said X-Y two-dimensional light scanning means is preferably provided at the pupil position of the illuminating optical system since such arrangement provides a constant intensity distribution in the laser beam illuminating the entrance pupil of the illuminating optical system. Such feature is not only important in the image formation but also provides an advantage of effective utilization of the light from the laser light source 1.

The light beam emerging from the X-Y two-dimensional optical scanning means 3 is focused, on a specimen 6 supported by support means 5, as a light spot of diffraction limit by an objective lens 4 constituting the illuminating optical system. The support means 5 in this case is composed of a fixed stage. In case of two-dimensionally scanning the specimen 6 by the Galvano mirror as the X-Y two-dimensional optical scanning means 3 and the fixed stage, there are employed two Galvano mirrors rendered independently movable in the plane of FIG. 1 and in a direction perpendicular to the plane thereof, respectively. Said Galvano mirrors may naturally be replaced by polygon mirrors or acoustooptical elements. Thus the light spot condensed on the specimen 6 scans said specimen 6 two-dimensionally, by means of the X-Y two-dimensional optical scanning means 3.

The light beam transmitted by the specimen 6 is refracted by a lens 7 with positive refractive power, constituting the optical system with positive refractive power and is guided onto a two-dimensional image sensor 8, which is so positioned as to be conjugate with the light deflecting plane of said scanning means 3. Consequently, as already explained, the position of the light beam remains constant on the two-dimensional image sensor 8 even though the light spot moves on the specimen 6 by the X-Y two-dimensional optical scanning means 3. Said two-dimensional image sensor is most effectively composed of a CCD image sensor.

The two-dimensional image sensor 8 converts the light, entering each pixel thereof, into an electrical signal, and thus converted electrical image output signal from said sensor 8 is converted into a digital signal by a digitizing device 9 and is fetched into a frame memory 10, which is adapted to store the signals required for constituting an image. Said signal fetching into the frame memory 10 is so controlled as to be synchronized with the X-Y two-dimensional optical scanning means 3, by means of a controller 11. Thus, for every movement of the light spot position by a pixel, an image output signal from the two-dimensional image sensor 8 is fetched in the frame memory 10.

The image information stored in the frame memory 10 directly represents a far-field diffraction pattern in case a point on the specimen 6 is illuminated with the light spot. Said image information is transferred to a memory 13 and stored therein, before the light spot moves to a next pixel position. However, it is often not required to transfer all the information, stored in the frame memory 10, to the memory 13. In order to cope with such case, there is inserted, between the frame memory 10 and the memory 13, a first two-dimensional image processing device 12 for effecting, for example, identification of unnecessary pixels in the frame memory and averaging of outputs of plural pixels.

In case of obtaining CT images, there is effectively employed as the two-dimensional image sensor 8 a doughnut-shaped image sensor having the pixels not in the central part but only in the peripheral area. In order to obtain effective CT images, images of the specimen viewed from the front thereof are not so important, but it is necessary to obtain images of the specimen viewed from the side thereof as much as possible. Therefore, it is effective to employ the doughnut-shaped image sensor having the pixels not in the central part so as to obtain the images of the specimen viewed from the side thereof.

The information recording is completed when the scanning operation with the light spot is terminated. In the following there will be explained the reproduction of thus recorded image information. As explained in the foregoing, the memory 13 stores information relating to the far-field diffraction pattern when the light spot is in different positions. Therefore, by reproducing an image through a second two-dimensional image processing device 14 by extracting only a part of the far-field diffraction pattern from the memory 13 and displaying said image on a monitor 15 constituting the display device, there can be obtained an image as if the illuminating condition is altered in an imaging microscope.

Figure 3:
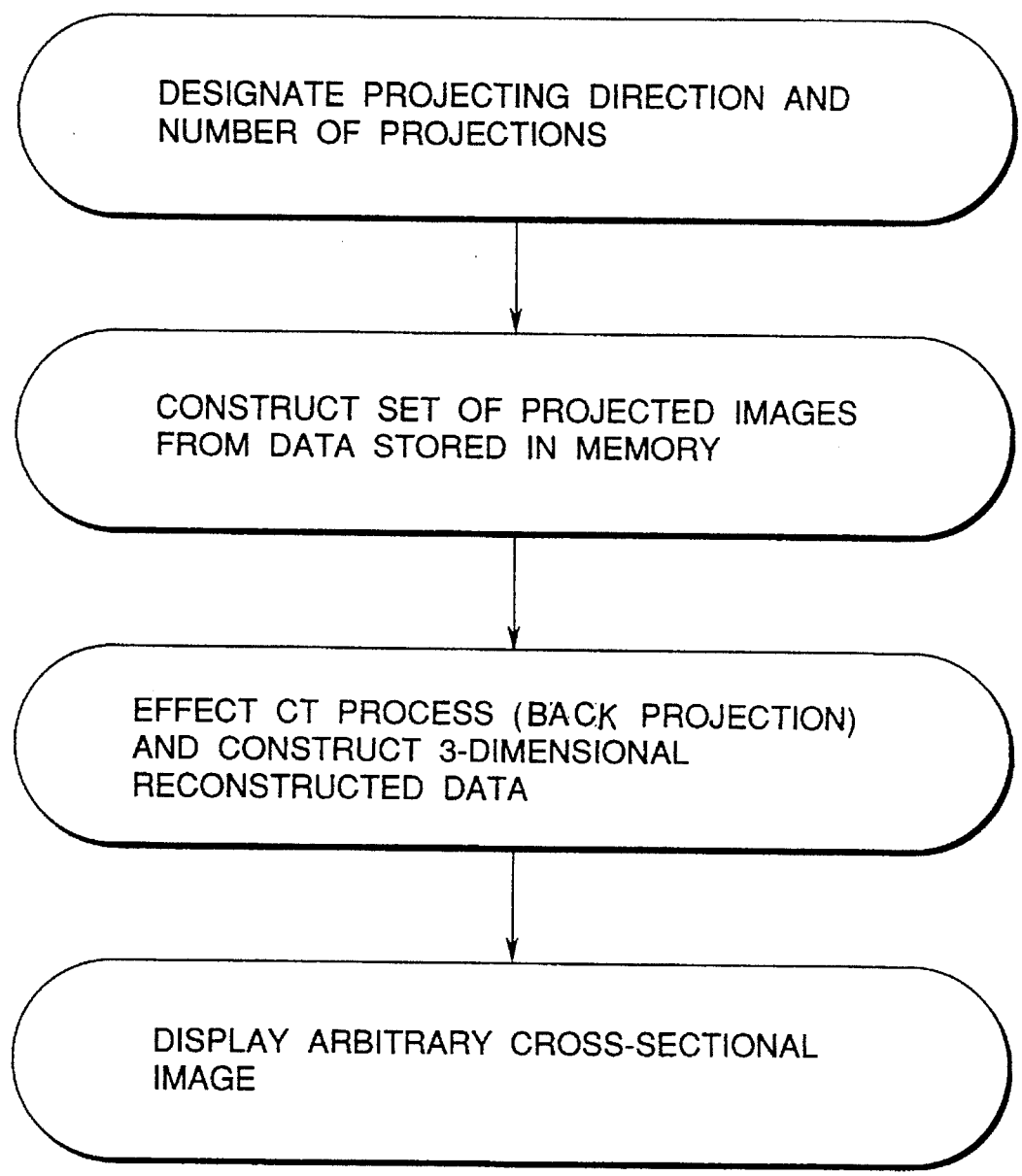
FIG. 3 is a flow chart showing the signal processing for obtaining a CT image of the present invention.
Figure 4:
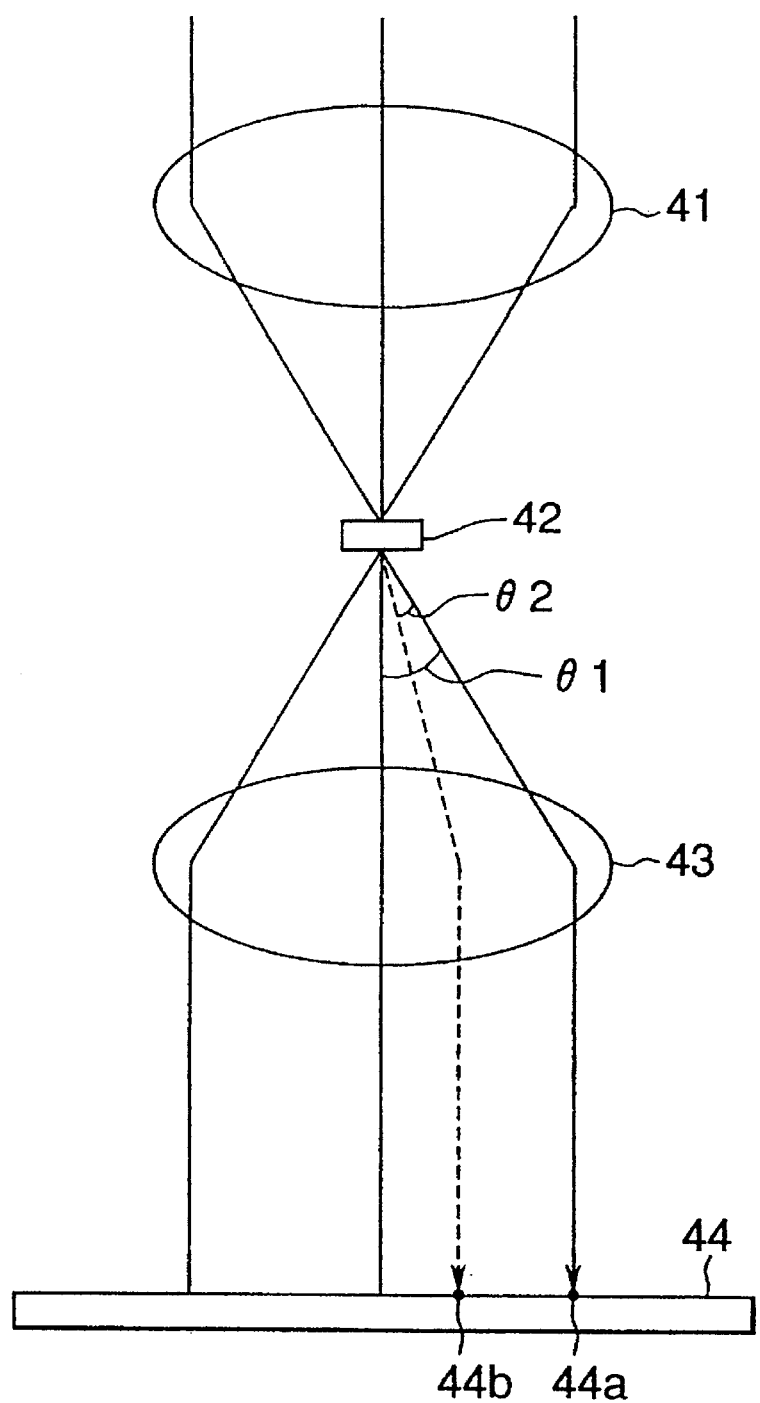
FIG. 4 is a schematic view showing the principle of the present invention.
Figure 5:
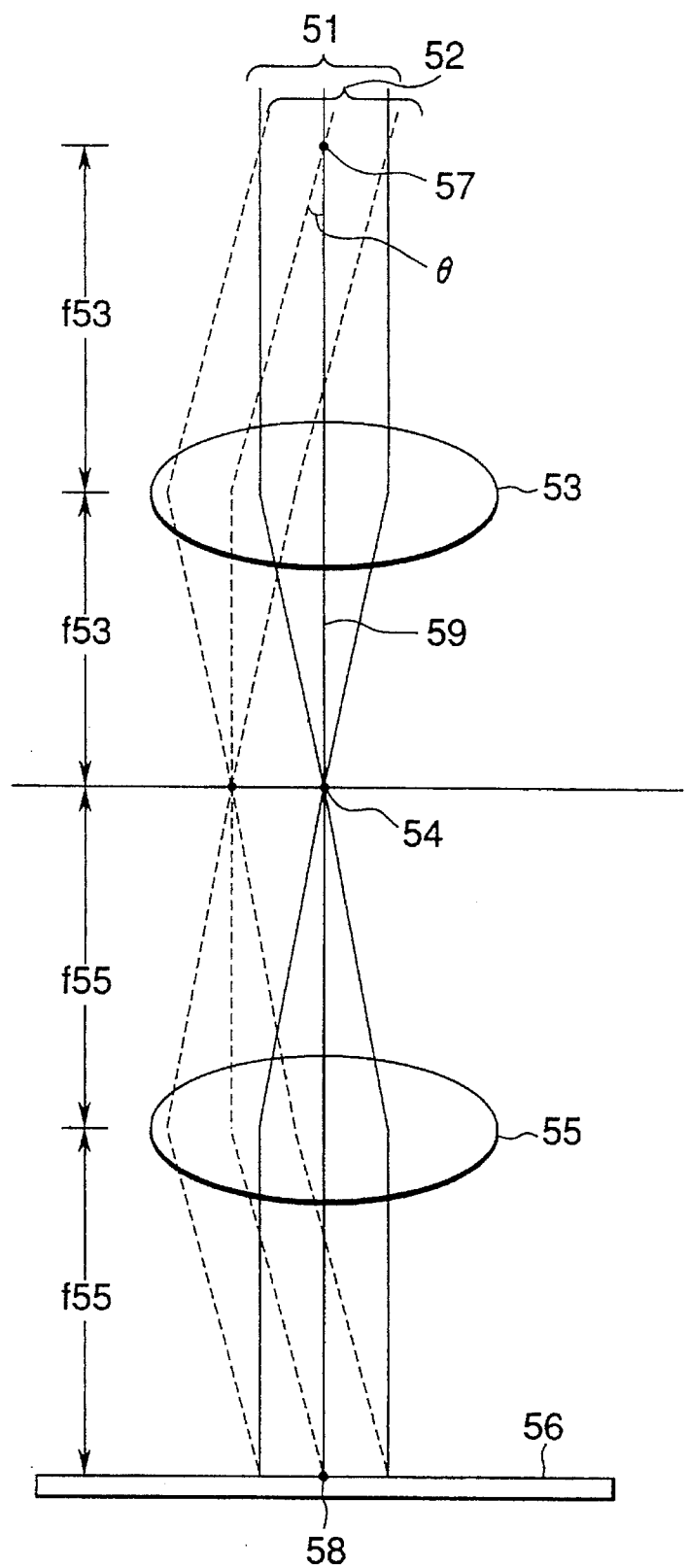
FIG. 5 is a schematic view showing the arrangement of an optical system in case a beam scanning operation is employed.

Also the second two-dimensional image processing device 14 is capable of preparing plural images corresponding to such different illuminating conditions and then, by computation, displaying a CT image of the specimen 6 on the monitor 15. The signal processing in such case follows a flow chart shown in FIG. 3. At first there are designated the direction of projections and the number of projections, thus defining the pixels of the two-dimensional image sensor 8, from which the observed (projected) images are obtained. Subsequently the observed (projected) images are constructed from the data stored in the memory 13, and three-dimensional reconstructed data are obtained by a CT process. All these processes are executed by the second two-dimensional image processing device 14. Finally a section image is displayed on the monitor 15, according to the selection of an arbitrary section plane. Though all the image processings are conducted by the second two-dimensional image processing device 14, a part of said processings may also be executed by the first two-dimensional image processing device 12 if the directions and number of projections can be designated prior to the recording of the information of the specimen 6.

The image determined by computation is naturally not limited to a CT image. Of course the two two-dimensional image processing devices 12, 14 in FIG. 1 can be the same.

Figure 2:
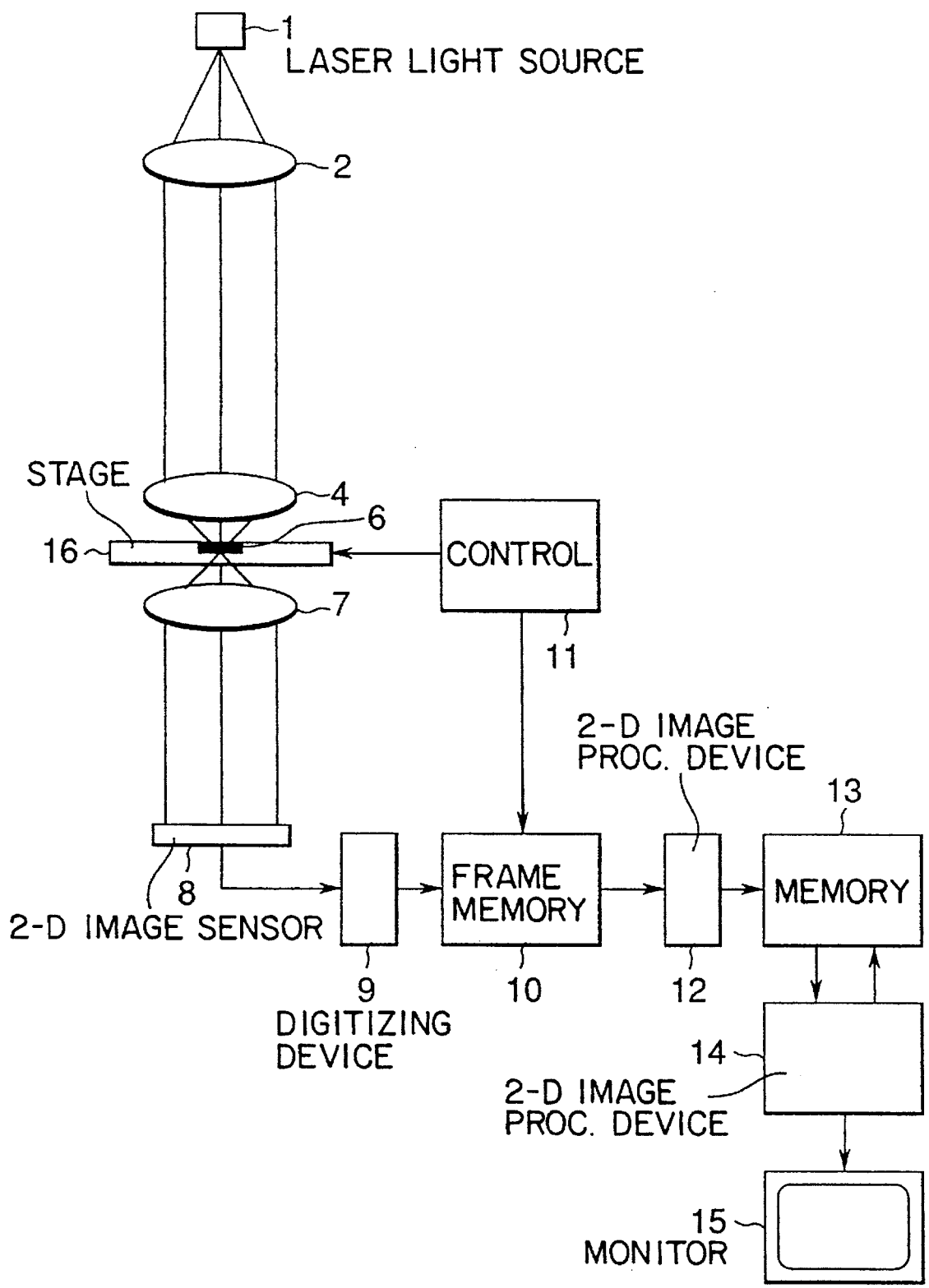
FIG. 2 is a schematic view showing the configuration of a second embodiment of the laser scanning microscope

In the following there will be explained a second embodiment, with reference to FIG. 2, which schematically shows the configuration of said second embodiment.

This second embodiment is featured by a fact that the X-Y two-dimensional optical scanning means in the first embodiment is replaced by so-called stage scanning executed by the movement of a stage 16. In this case the image output signals from the two-dimensional image sensor 8 are fetched into the frame memory 10 in synchronization, by the controller 11, with an unrepresented driver for the stage. The present embodiment will be explained in detail in the following.

Light emitted from the laser light source 1 is converted into a parallel light beam by the lens 2 constituting the illuminating optical system, and is condensed as a light spot of diffraction limit by the objective lens 4 constituting the illuminating optical system, thereby illuminating the specimen 6 supported by the stage 16.

The stage 16 is moved by an unrepresented driver in the horizontal direction in the drawing and in a direction perpendicular to the plane of drawing, thereby achieving two-dimensional scanning of the specimen 6. Said driver for the stage can, for example, be a motor or the like. The light transmitted by the specimen 6 is refracted by the lens 7 constituting the optical system with positive refractive power and is guided to the two-dimensional image sensor 8, which can be provided at any position except for the focal point of the lens 7 and the vicinity thereof. In this embodiment, as a focal point of the lens 7 is on the specimen 6, the light beam reaching the two-dimensional image sensor 8 is in the state of a parallel light beam. By such configuration, the guided light beam remains in a fixed position on the two-dimensional image sensor 8.

The two-dimensional image sensor 8 converts the amount of light, entering each pixel thereof, into an electrical signal, and thus converted electrical image output signal from said image sensor 8 is converted into a digital signal by the digitizing device 9 and is fetched into the frame memory 10. Said signal fetching by the frame memory 10 is controlled by the controller 11 so as to be synchronized with the unrepresented driver for the stage. Thus for every movement of the stage 16 by a pixel, an image output signal from the two-dimensional image sensor 8 is fetched in the frame memory 10.

The image information stored in the frame memory 10 directly represents a far-field diffraction pattern in case a point on the specimen 6 is illuminated with the light spot. Said image information is transferred to the memory 13 and stored therein before the light spot moves to a next pixel position. However, it is often not required to transfer all the information, stored in the frame memory 10, to the memory 13. In order to cope with such case, there is inserted, between the frame memory 10 and the memory 13, the first two-dimensional image processing device 12 for effecting, for example, identification of unnecessary pixels in the frame memory and averaging of outputs of plural pixels.

The information recording is completed when the scanning operation with the light spot is terminated. In the following there will be explained the reproduction of thus recorded image information. As explained in the foregoing, the memory 13 stores information relating to the far-field diffraction pattern when the light spot is in different positions. Therefore, by reproducing an image through the second two-dimensional image processing device 14 by extracting only a part of the far-field diffraction pattern from the memory 13 and displaying said image on the monitor 15 constituting the display device, there can be obtained an image as if the illuminating condition is altered in an imaging microscope.

As in the first embodiment, the two-dimensional image processing device 14 is further capable of displaying the CT image of the specimen 6 on the monitor 15. The signal processing in such case follows the flow chart shown in FIG. 3, as in the case of the first embodiment.

The image determined by computation is naturally not limited to the CT image. Also the two two-dimensional image processing devices 12, 14 in FIG. 2 can be the same.

The foregoing two embodiments represent a refractive laser scanning microscope, but the present invention is applicable likewise to a reflective laser scanning microscope. In such application to the reflective laser scanning microscope, the illuminating optical system serves also as the optical system with positive refractive power.

As explained in the foregoing, the present invention easily obtains images that can be obtained, in case of a microscope of imaging type, only by varying the illuminating condition in various manners further, after the completion of the scanning operation, it is possible to obtain an image under an arbitrary illuminating condition, by the information stored in the memory. Also all these images, corresponding to such different illuminating conditions, are recorded at a same time, and this feature is very useful particularly in obtaining the optical CT images of a specimen of a living organism.

Also the laser scanning microscope of the present invention, owing to its configuration, dispenses with cumbersome mechanical operations in varying the illuminating condition.

Furthermore, the configuration of the laser scanning microscope of the present invention is advantageous in case the specimen executes high-speed movement. If the scanning operation of the light spot is conducted by a Galvano mirror or the like, the scanning of an image frame (512×512 pixels) in general requires about one second. Such scanning time can be significantly reduced by so-called band scanning in which only an interesting portion in the image frame is scanned. Such technology is already well known in the field of the laser scanning microscope, but the configuration of the present invention provides an unrivalled advantage of obtaining images corresponding to different illuminating conditions at a same time.

What is claimed is:

1. A laser scanning microscope, comprising:

a laser light source;

an illuminating optical system for condensing a light beam from said laser light source to form a light spot on a specimen;

scanning means for causing relative movement of said light spot with respect to said specimen by moving a support stage for said specimen;

a two-dimensional image sensor for measuring light from said specimen;

an optical system with positive refractive power for guiding the light beam from said specimen to a light-receiving face of said two-dimensional image sensor;

said two-dimensional image sensor being provided at a position displaced from a conjugate point of said light spot by such an amount that the light beam forms a far-field diffraction pattern of said specimen on said light-receiving face of said two-dimensional image sensor;

a memory for storing digital signals representing output signals from plural pixels of said two-dimensional image sensor upon scanning of said specimen with said light spot; and a display device for displaying an image of said specimen, based on output signals from said two-dimensional image sensor or signals stored in said memory.

2. A laser scanning microscope according to claim 1, wherein a sum is calculated based on the output signals from mutually closely positioned pixels and a signal based on the sum thus obtained is stored in said memory as a representative value of the output signals of those pixels.

3. A laser scanning microscope according to claim 1, wherein the image of said specimen is displayed on said display device, utilizing signals from said memory that represent output signals of only a part of said plural pixels of said two-dimensional image sensor.

4. A laser scanning microscope according to claim 1, further comprising:

a two-dimensional image processing device that performs digital calculation; and wherein the image of the specimen is calculated and displayed on said display device, based on plural images of said specimen, each reproduced utilizing signals from said memory that represent output signals obtained from a different part of said plural pixels of said two-dimensional image sensor.

5. A laser scanning microscope according to claim 4, wherein said image calculated based on said plural images is a computed tomographic image of said specimen.

6. A laser scanning microscope according to claim 5, wherein said two-dimensional image sensor has a doughnut shape.

7. A laser scanning microscope according to claim 1, wherein said light spot is scanned two-dimensionally relative to said specimen.

8. A laser scanning microscope comprising:

a laser light source;

an illuminating optical system for condensing a light beam from said laser light source to form a light spot on a specimen;

scanning means for causing relative movement of said light spot with respect to said specimen, said scanning means including light deflecting means provided at a pupil position of said illuminating optical system;

a two-dimensional image sensor for measuring light from said specimen;

an optical system with positive refractive power for guiding the light beam from said specimen to a light-receiving face of said two-dimensional image sensor;

said two-dimensional image sensor being provided in said optical system with positive refractive power at a position conjugate with a light deflecting plane of said light deflecting means and displaced from a conjugate point of said light spot by such an amount that the light beam forms a far-field diffraction pattern of said specimen on said light-receiving face of said two-dimensional image sensor, a memory for storing digital signals representing output signals from plural pixels of said two-dimensional image sensor upon scanning of said specimen with said light spot; and a display device for displaying an image of said specimen, based on output signals from said two-dimensional image sensor or signals stored in said memory.

9. A laser scanning microscope according to claim 8, wherein a sum is calculated on based output signals from mutually closely positioned pixels and a signal based on the sum thus obtained is stored in said memory as a representative value of the output signals of those pixels.

10. A laser scanning microscope according to claim 8, wherein the image of said specimen is displayed on said display device, utilizing signals from said memory that represent output signals of only a part of said plural pixels of said two-dimensional image sensor.

11. A laser scanning microscope according to claim 8, further comprising:
- a two-dimensional image processing device that performs digital calculation; and
- wherein the image of the specimen is calculated and displayed on said display device, based on plural images of said specimen, each reproduced utilizing signals from said memory that represent output signals obtained from a different part of said plural pixels of said two-dimensional image sensor.

12. A laser scanning microscope according to claim 11, wherein said image calculated based on said plural images is a computed tomographic image of said specimen.

13. A laser scanning microscope according to claim 12, wherein said two-dimensional image sensor has a doughnut shape.

14. A laser scanning microscope according to claim 8, wherein said light spot is scanned two-dimensionally relative to said specimen.

* * * * *